United States Patent [19]
Abe et al.

[11] 4,198,126
[45] Apr. 15, 1980

[54] ZOOM LENS SYSTEM CAPABLE OF MACROPHOTOGRAPHY

[75] Inventors: Haruo Abe; Mitsuo Yasukuni, both of Sakai, Japan

[73] Assignee: Minolta Camera Kabushiki Kaisha, Osaka, Japan

[21] Appl. No.: 798,365

[22] Filed: May 19, 1977

[30] Foreign Application Priority Data

May 27, 1976 [JP] Japan .................................. 51-61923

[51] Int. Cl.$^2$ ............................................. G01B 15/18
[52] U.S. Cl. ..................................................... 350/184
[58] Field of Search .................................. 350/186, 184

[56] References Cited

U.S. PATENT DOCUMENTS

| | | | |
|---|---|---|---|
| 3,659,921 | 5/1972 | Hirose | 350/186 |
| 3,784,284 | 1/1974 | Nakamura | 350/186 |
| 3,961,845 | 6/1976 | Doi et al. | 350/186 |
| 4,054,372 | 10/1977 | Schroeder | 350/186 |
| 4,080,047 | 3/1978 | Uesugi et al. | 350/186 |

FOREIGN PATENT DOCUMENTS

51-6564 of 1976 Japan .

*Primary Examiner*—Conrad J. Clark
*Attorney, Agent, or Firm*—Jackson, Jones & Price

[57] ABSTRACT

The present lens system is capable of providing both a zooming operation and also a relatively efficient and economical macrophotography mode of operation. The zoom lens system contains the basic conventional lens groups of a focusing lens group, variator lens group, compensator lens group and relay lens group. These individual lens group function in a conventional manner during a zooming mode of operation. However, during the macrophotography mode of operation, the individual lens element that form the relay lens group are capable of coordinate movement with other lens elements in the lens system to provide a relatively compact and economical lens design for macrophotography. Thus, the relay lens group is not only capable of performing its normal auxiliary function of image transmission and final balancing of aberrations imposed by the design parameters of the zoom mode of operation but is further capable of compensating for the introduction of aberrations that will occur in the macrophotography mode of operation. In some embodiments, the plurality of movable lens elements that form the relay lens group has at least that movable lens element closest to the design image plane moved to provide the second macrophotography mode of operation.

21 Claims, 41 Drawing Figures

Spherical Aberration    Astigmatism    Distortion

Spherical Aberration    Astigmatism    Distortion

Spherical Aberration

Astigmatism

Distortion

Spherical Aberration

Astigmatism

Distortion

Spherical Aberration

Astigmatism

Distortion

Spherical Aberration

Astigmatism

Distortion

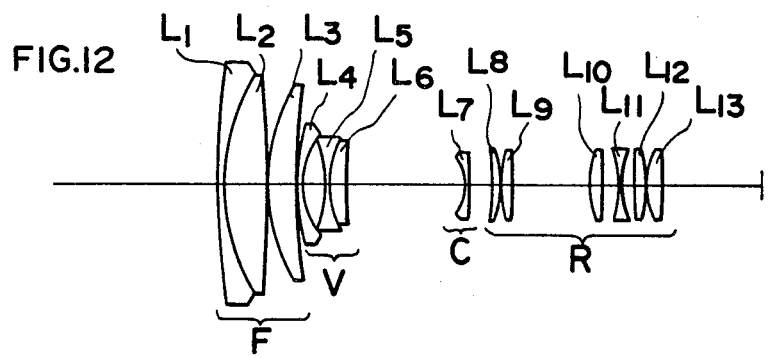
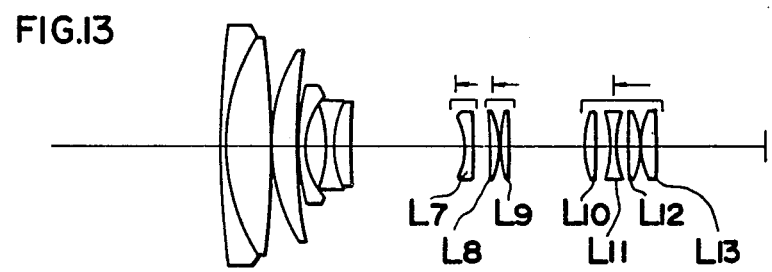
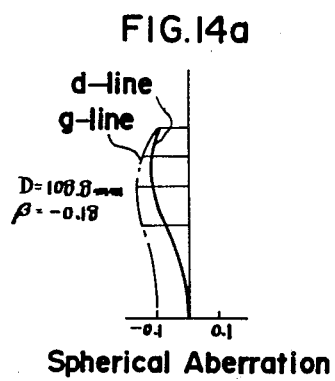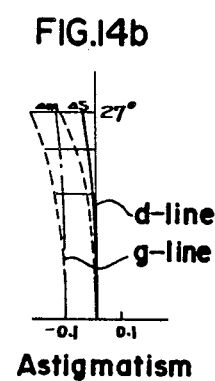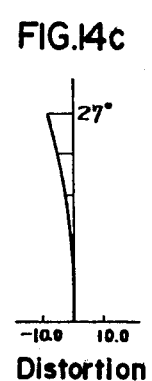
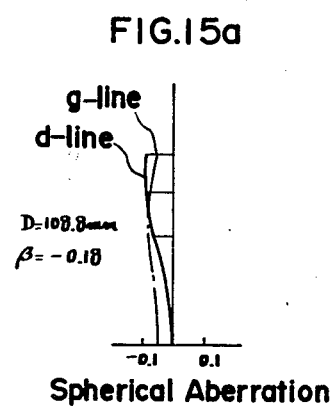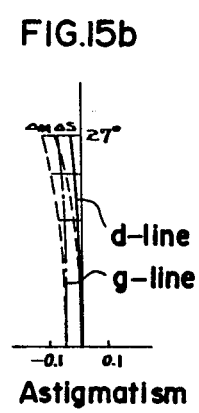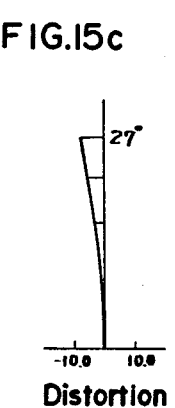

Spherical Aberration

Astigmatism

Distortion

Spherical Aberration

Astigmatism

Distortion

ZOOM LENS SYSTEM CAPABLE OF MACROPHOTOGRAPHY

BACKGROUND OF THE INVENTION

1. Field of the Invention

This invention relates to zoom lens systems and more particularly to an improved zoom lens system having macrophotography capabilities.

2. Description of the Prior Art

In the field of zoom lens systems, several techniques have heretofore been proposed for focusing in the macrophotography range. As the prior art is aware, the inclusion of a macrophotography range, is understood to refer to photographing objects at less than one meter, and in most cases with a magnification of the image. Many of the zoom lens systems that have incorporated macrophotography have required that either the entire zoom lens system or some varifocal lens group thereof be provided with a specific movement which is at variance with the movement required for normal zooming photography within the normal range of object distance. As a result, the arrangement of the lens elements, in a macrophotographic mode of operation is thus different from the normal lens arrangement and the resulting balancing of the various aberrations that are created intrinsically in a zoom lens system is disturbed. These aberrations are transferred to the image plane by the relay lens group and because the transferring magnification of the relay lens group is particularly high in the case of a telephoto zoom lens system, the resulting image characteristics are deteriorated to such an extent that no practical utility is possible unless the aperture is severely stop down. Obviously, this limits the speed and conditions under which macrophotography is possible.

Optical designers have realized that in order to design such a lens system wherein satisfactory optical performance is possible in a macrophotographic mode that it is necessary to sacrifice some of the optical performance attainable in the zooming photography mode of operation within the normal range of object distance. To avoid this result, it has been necessary in the prior art zoom lens systems capable of macrophotography to increase the number of lens elements in the lens system if it is desired to obtain satisfactory performances in both the normal zooming photography and macrophotography ranges.

An example of a varifocal lens system with macrophotography capabilities can be found in U.S. Pat. No. 3,994,572. An additional example wherein a focusing lens is shifted to its extreme foremost end and the front group of a relay lens is shifted toward the image plane, can be found in U.S. Pat. No. 3,659,921.

Other examples of prior art combinations of a zooming operation with macrophotography can be found in U.S. Pat. No. 3,912,373, U.S. Pat. No. 3,655,271, U.S. Pat. No. 3,613,544, U.S. Pat. No. 3,784,284 and U.S. Pat. No. 3,784,285.

A Japanese patent application which has been laid open to the public and identified as No. 51-6564, discloses a zoom lens operation wherein a variator and compensator lens group is shiftable for a zooming operation and at least a part of the relay lens group is shiftable for correcting undesirable variations in aberrations created during the zooming mode of operation. To date, there has been an inadequate effort to provide a correction of aberrations that occur in a macrophotography mode of operation while limiting the number of lens elements and providing an adequate aperture number to meet the needs of a versatile zoom and macrophotographic lens system.

SUMMARY OF THE INVENTION

It is an object of the present invention to provide a relatively simple zoom lens system having a macrophotography capability wherein any aberrations created by the macrophotography mode of operation can be easily corrected.

The present invention includes a focusing lens group, a variator lens group, a compensator lens group and a relay lens group having a plurality of movable lens elements. Focusing can be accomplished by the conventional shifting of the front lens group over the range of infinity to a relatively close distance in the zoom mode of operation. The variator and compensator lens groups are shiftable in a predetermined relationship to provide the zooming operation. In a macrophotography range of operation a portion of the zoom lens system is movable in conjunction with the portion of the relay lens group to permit the correction of any undesirable introduction of aberrations during macrophotography. During the macrophotography mode of operation, the entire zoom lens system or a portion thereof can be given a different movement while being accompanied with a lens movement of at least a portion of the relay lens group to provide a highly corrected fine image with acceptable aperture numbers.

The objects and features of the present invention which are believed to be novel are set forth with particularly in the appended claims. The present invention, both as to its organization and advantages thereof, may best be understood by reference to the following description, taken in connection with the accompanying drawings.

BRIEF DESCRIPTION OF THE DRAWINGS

FIG. 12 is a schematic cross-sectional view of another embodiment of the present invention in an extreme telephotographic position;

FIG. 13 is a schematic view of the embodiment of FIG. 12 in a macrophotographic position;

FIGS. 14a, 14b and 14c are respectively the aberration curves when only the compensator lens group of FIG. 13 is shifted towards the object side in a macrophotographic position;

FIGS. 15a, 15b and 15c are respectively the aberration curves for the macrophotographic position disclosed in FIG. 13, in accordance with the principles of the present invention;

BRIEF DESCRIPTION OF THE PREFERRED EMBODIMENTS

Figure 1:
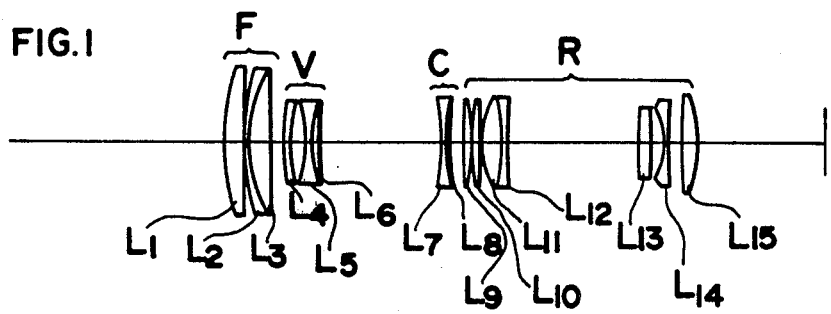
FIG. 1 is a schematic cross-sectional view of a zoom lens system having macrophotography capabilities at an extreme wide angle photographic lens element position.

The following specification taken in conjunction with the drawing sets forth various examples of the present invention in such a manner that any person skilled in the optical field, can make and use the invention. The embodiments of the invention disclosed herein, are the best modes contemplated by the inventors in carrying out their invention, although it should be understood that various modifications can be accomplished within the parameters of the invention.

The derivation of the lens parameters set forth herein can be accomplished with the assistance of a computer. The present invention represents the parameters of a compromised balance of acceptable aberrations in a relatively easily manufactured and low cost lens system for utilization, for example with a camera.

When referring herein to a lens component, it is to be understood, both in the specification and the claims that the term "lens" is intended to be interpreted broadly enough to cover a single lens element or an equivalent comprising a group of two or more lens elements or even a doublet.

As usual, in conventional lens diagrams, the light is assumed to travel from left to right. The individual lens can be designated by the letter, L, with a subscript indicating the position of the lens element as numbered consecutively from the object to image side. The radii of curvature of the lens are indicated in the tables by, r, with a subscript corresponding to the consecutive surfaces of the lens elements. The minus signs indicate surfaces concave toward the object side, while the surface without a sign are convex toward the object side. The Tables also disclose the axial spacings, d, along the optical axis and include both the axial spacings between the lens elements and the thickness of the lens elements. The axial spacings between the lens elements are positioned accordingly relative to the radii in the tables while the thicknesses are designated accordingly between the radii. All linear dimensions are given in absolute values and are given with reference to the equivalent focal length of unity. The refractive index, n, and Abbe number, $\nu$, are also provided in the tables.

As simply a reference to both the complexity and background theory for designing multiple element varifocal lens system reference is made to "Four Component Optically Compensated Varifocal Systems," Journal of the Optical Society of America, Vol. 52, No, 4, Page 376, by Bergstein et al which is incorporated herein by reference to supplement the disclosure.

As can be appreciated by an optical lens designer, the interrelationship of the various parameters of each lens element in a relatively sophisticated zooming lens system are complex and the schematic drawings attached hereto are provided simply as a pictorial aid in understanding the present invention. The value of the present invention, however, is more appropriately gaged by reference to a comparison of the aberration curves, for it is here that the results of the design efforts of the present inventors can be fully realized. In this regard, the inventors have recognized the value of a full utilization of the auxiliary or relay lens group which is generally utilized as simply an adjunct to the design of the basic varifocal zoom lens components. In this regard, the present inventors have been capable of providing lens designs that are compatible with the commercial demands of a relatively economic and compact lens system having sufficient speed for practical use by a photographer in the field. Thus, appropriate compensation of varous aberrations that are introduced or enhanced in a macrophotography mode of operation such as astigmatism are sufficiently compensated for to provide a viable and acceptable image transmission.

A first example of the present invention is disclosed in a schematic view in FIG. 1. Referring to FIG. 1, the symbol F identifies a focusing lens group, V refers to the variator lens group, C is the compensator lens group, and R is the relay lens group. The lens elements are shown in their relative position when the lens system is set for extreme wideangle photography in a zooming mode focused at infinity. Focusing can be achieved by movement of the focusing lens group $L_1$ through $L_3$ forward or towards the object side of the lens system.

Figure 2:
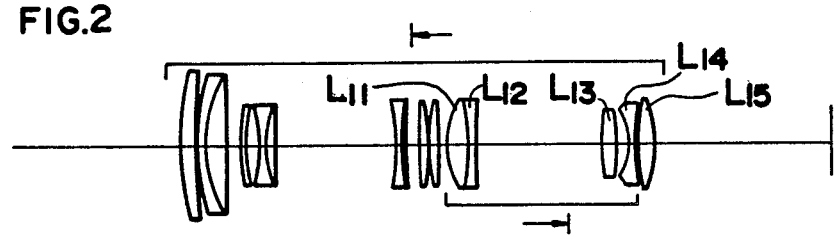
FIG. 2 is a schematic view of the lens system of FIG. 1 in a macrophotographic position.

As can be seen in FIG. 2, a macrophogoraphy mode of operation is disclosed. The entire lens system has been shifted forward as a unit except for the lens components $L_{11}$ through $L_{14}$ of the relay lens group R. These relay lens group elements are shifted rearward or towards the image side and their rate of relative movement is about 1/4.5 the rate of relative movement of the rest of the lens elements in the entire zoom lens system. The following Table provides the operative lens parameters for an improved zoom lens system with macrophotography that is representative of the first example shown in FIGS. 1 and 2.

Table 1

| | | | | f = 75~200 | Aperture Ratio 1:4.0 | | Field Angle 2ω = 32°~12° | | |
|---|---|---|---|---|---|---|---|---|---|
| | | | | Radius of Curvature | | Axial Distance | Refractive Index | | Abbe Number |
| F | $L_1$ | | $r_1$ | 95.7 | $d_1$ | 5.6 | $n_1$ 1.5176 | $\nu_1$ | 53.5 |
| | | | $r_2$ | 735.6 | $d_2$ | 0.1 | | | |
| | $L_2$ | | $r_3$ | 102.8 | $d_3$ | 1.7 | $n_2$ 1.7545 | $\nu_2$ | 32.8 |
| | | | | 46.0 | | | | | |
| | $L_3$ | | | | $d_4$ | 7.1 | $n_3$ 1.6031 | $\nu_3$ | 60.7 |
| | | | $r_5$ | 1546.0 | | | | | |
| | | | | | $d_5$ | 4.8~43.0 (variable) | | | |
| V | $L_4$ | | $r_6$ | 124.3 | $d_6$ | 1.2 | $n_4$ 1.72 | $\nu_4$ | 50.2 |
| | | | $r_7$ | 41.0 | $d_7$ | 5.7 | | | |
| | $L_5$ | | $r_8$ | −44.9 | $d_8$ | 1.5 | $n_5$ 1.6 | $\nu_5$ | 64.4 |
| | | | $r_9$ | 44.3 | | | | | |
| | $L_6$ | | | | $d_9$ | 3.2 | $n_6$ 1.7847 | $\nu_6$ | 25.8 |
| | | | $r_{10}$ | 285.3 | | | | | |
| | | | | | $d_{10}$ | 39.1~3.3 (variable) | | | |
| C | $L_7$ | | $r_{11}$ | −128.0 | $d_{11}$ | 1.9 | $n_7$ 1.6057 | $\nu_7$ | 37.8 |
| | | | $r_{12}$ | 88.5 | | | | | |
| | $L_8$ | | | | $d_{12}$ | 1.8 | $n_8$ 1.744 | $\nu_8$ | 45.0 |
| | | | $r_{13}$ | 245.4 | | | | | |
| | | | | | $d_{13}$ | 3.9~1.5 (variable) | | | |
| R | $L_9$ | | $r_{14}$ | ∞ | $d_{14}$ | 2.8 | $n_9$ 1.4875 | $\nu_9$ | 70.2 |
| | | | $r_{15}$ | −66.9 | $d_{15}$ | 0.1 | | | |
| | $L_{10}$ | | $r_{16}$ | 113.7 | $d_{16}$ | 2.6 | $n_{10}$ 1.4875 | $\nu_{10}$ | 70.2 |
| | | | $r_{17}$ | −238.7 | $d_{17}$ | 0.1 | | | |
| | $L_{11}$ | | $r_{18}$ | 34.5 | $d_{18}$ | 7.0 | $n_{11}$ 1.4875 | $\nu_{11}$ | 70.2 |
| | | | $r_{19}$ | −65.6 | | | | | |
| | $L_{12}$ | | | | $d_{19}$ | 2.7 | $n_{12}$ 1.7569 | $\nu_{12}$ | 31.8 |
| | | | $r_{20}$ | −1115.0 | $d_{20}$ | 42.3 | | | |
| | $L_{13}$ | | $r_{21}$ | 163.2 | $d_{21}$ | 5.2 | $n_{13}$ 1.5168 | $\nu_{13}$ | 64.0 |
| | | | $r_{22}$ | −171.4 | $d_{22}$ | 3.9 | | | |
| | $L_{14}$ | | $r_{23}$ | −22.5 | $d_{23}$ | 1.5 | $n_{14}$ 1.7352 | $\nu_{14}$ | 40.9 |
| | | | $r_{24}$ | 531.5 | $d_{24}$ | 3.9 | | | |
| | $L_{15}$ | | $r_{25}$ | 118.0 | $d_{25}$ | 6.0 | $n_{15}$ 1.62 | $\nu_{15}$ | 36.3 |
| | | | $r_{26}$ | −42.1 | | | | | |

F ($L_1$~$L_3$) : Focusing Lens Group
V ($L_4$~$L_6$) : Variator Lens Group
C ($L_7$, $L_8$) : Compensator Lens Group
R ($L_9$~$L_{15}$) : Relay Lens Group A true appreciation of the advantages of the present invention can be determined by focusing upon the particular use of the relay lens group to effectuate the design objectives of improved macrophotography capability. In a normal varifocal or zoom lens design, the relay lens group or auxiliary lens group is classically not considered part of the varifocal lens system proper. The relay lens group is, however, a necessary part of the overall varifocal lens system and has generally been used to obtain the desired absolute focal range, the desired type of final image (real or virtual, inverted or upright) and the position of this image in space. The relay lens group has also been used to achieve a satisfactory state of correction of various image aberrations.

Figures 3A, 3B, 3C:
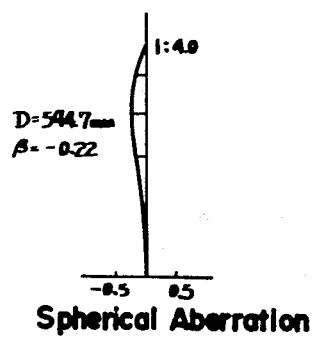
FIG. 3a, 3b and 3c disclose respectively the spherical aberration, astigmatism, and distortion that are associated with a conventional movement of the zoom lens group for a macrophotographic position.

Referring to the aberration curves in FIGS. 3a, 3b and 3c, these plots represent the respective spherical aberration, astigmatism, and distortion that results when the entire lens system disclosed in FIG. 1 has been shifted forward as a complete unit by approximately 17 mm. This forward movement includes those movable lens elements $L_{11}$ through $L_{14}$ in the relay lens group. As can be seen, particularly with respect to the astigmatism, the off-axial and particularly the meridional image surface is negatively displaced to a considerable extent.

Figures 4A, 4B, 4C:
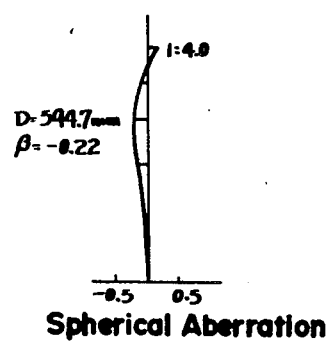
FIGS. 4a, 4b and 4c are the respective aberration curves for the macrophotographic position of FIG. 2.

The aberration plots disclosed in FIGS. 4a, 4b and 4c are representative of a lens system in accordance with the present invention in a macrophotography mode of operation. In this embodiment, the entire lens system except for the lens elements $L_{11}$ through $L_{14}$ of the relay lens group has been shifted forward again by about 17 mm. The lens elements $L_{11}$ through $L_{14}$ are shifted toward the image or rearward side by about 3.7 mm to provide a relative displacement with respect to their previous position in the entire lens system as shown in FIG. 2. By comparing the respective aberration plots, it can be seen that the off-axial and particularly the meridional image surface has been compensated to, in effect, restore the negative displacement of the off-axial image surface to almost normal and improve its balance thereof with the axial spherical aberration thus, contributing to a significant improvement in the resulting image surface characteristics. As can be equally appreciated by an optical lens designer, this improvement is capable of being achieved with a relatively simple lens barrel mechanism as will be subsequently disclosed.

Figure 5:
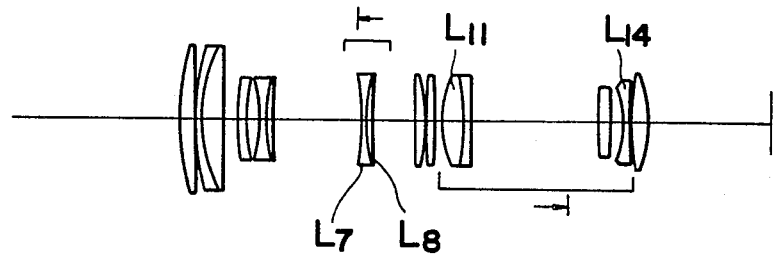
FIG. 5 is a cross-sectional schematic view of another embodiment of the present invention wherein the lens elements are in a macrophotographic position.

A second example of the present invention can be seen in FIG. 5. This zoom lens system is again of the type shown in Table 1 and for purposes of focusing within the range of infinity to a certain close distance, the focusing lens group $L_1$ to $L_3$ is shifted forward as a unit as seen in Table 1. To provide macrophotography beyond that normal focusing range, compensator lens group $L_7$ and $L_8$ at the extreme wide angle zoom position is shifted further forward while at the same time a portion of the relay lens groups, $L_{11}$ to $L_{14}$, is shifted rearward as a unit by about 1/2.7 of the amount of movement of the compensator lens group. The position of the lens elements for telephotographic photography when focused at infinity is similar to that disclosed in FIG. 1 and the respective lens groups can be shifted from this position to the lens positions disclosed in FIG. 5. Again, the relay lens group is utilized to compensate for aberrations in the macrophotography mode of operation and an image side lens element of the movable lens elements is again moved along the optical axis to achieve this effect.

Figure 6A:
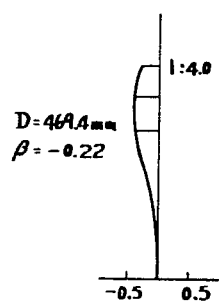
FIGS. 6a, 6b and 6c are the corresponding aberration curves when only the compensator lens group of FIG. 5 is repositioned for macrophotography.
Figure 6B:
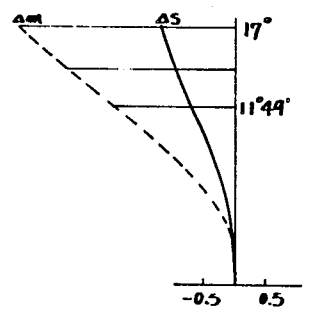
Figure 6C:
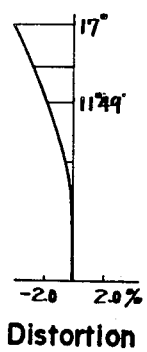
Figure 7A:
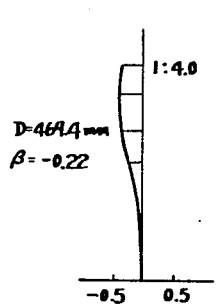
FIGS. 7a, 7b and 7c are the respective aberration curves, corresponding to the macrophotographic lens elements positioned shown in FIG. 5.
Figure 7B:
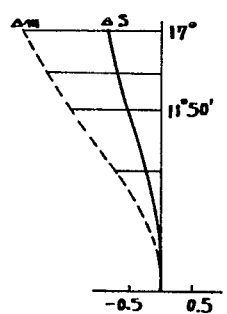
Figure 7C:
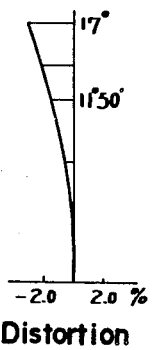

To illustrate the operation and result of the present invention, a comparison of the aberration curves is useful. The respective aberration plots in FIG. 6a, 6b and 6c disclose the resulting aberrations that are transmitted when only the compensator lens group $L_7$ and $L_8$ is shifted forward by about 10 mm. As can be seen, an excessive amount of negative displacement of the off-axial image surface will occur. The aberration plots disclosed in FIG. 7a, 7b and 7c are representative of the transmitted image when the compensator lens group $L_7$ and $L_8$ have been shifted forward by about 10 mm while at the same time, the movable lens elements in the relay lens group $L_{11}$ through $L_{14}$ have been shifted rearward by about 3.7 mm.

Figure 8:
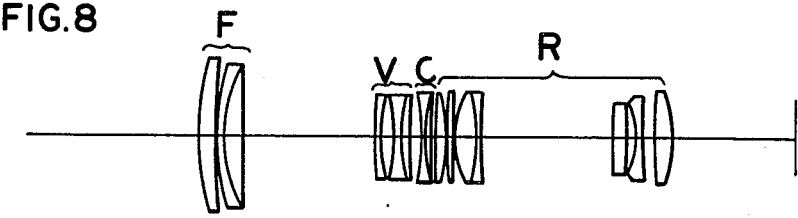
FIG. 8 is a schematic cross-sectional view corresponding to the embodiments of FIG. 1 and FIG. 5, the lens elements being positioned in an extreme telephotographic position.
Figure 9:
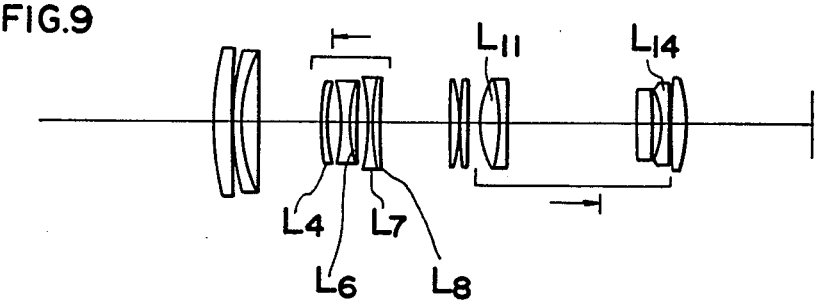
FIG. 9 is a schematic view of the embodiment of FIG. 8 in another macrophotographic position.

A third example of the present invention can be seen in FIG. 8, wherein the lens elements of Table 1 are positioned in an extreme telephotographic mode of operation while focused at infinity. As can be appreciated, the focusing lens group $L_1$ to $L_3$ can be shifted forward as a unit to provide a range of focusing between infinity to a relatively close distance. For a macrophotography mode of operation, beyond the normal range of focusing, the variator lens group $L_4$ through $L_6$ and the compensator lens group $L_7$ and $L_8$ are shifted forward from the telephotographic position as a unit while at the same time a portion of the relay lens group $L_{11}$ through $L_{14}$ is shifted rearward by about one-sixth of the movement of the varifocal lens groups shift. The resulting final lens elements positions in the macrophotography mode of operation are shown in FIG. 9.

Figure 10A:
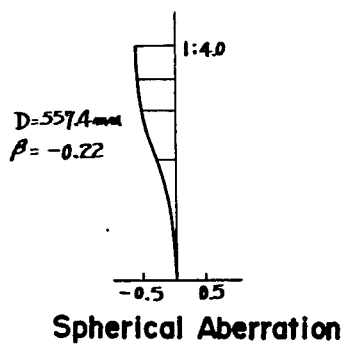
FIGS. 10a, 10b and 10c are the respective aberration curves that are produced when the variator lens group and the compensator lens group are shifted to the object side for macrophotography.
Figure 10B:
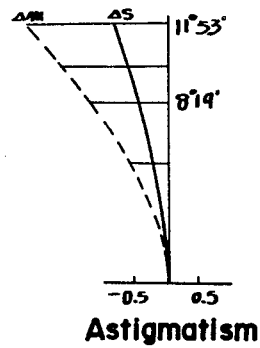
Figure 10C:
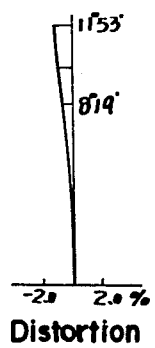
Figure 11A:
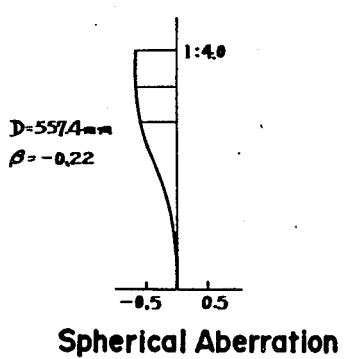
FIGS. 11a, 11b and 11c are the respective aberration curves for the embodiment shown in FIG. 9.
Figure 11B:
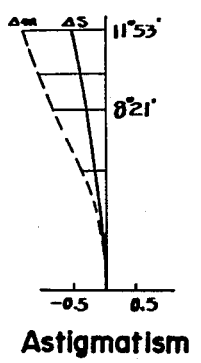
Figure 11C:
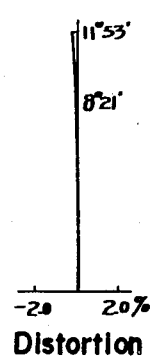

Referring to FIGS. 10a, 10b and 10c, plotted aberrations disclose the image transmission characteristics when the variator lens group and compensator lens group $L_4$ through $L_8$ have been shifted forward as a unit by about 22 mm while the relay lens group is held stationary. Again, the negative displacement of the off-axial image surface results in excessive distortion. This can be particularly appreciated when compared with the aberrations plotted in FIGS. 11a, 11b and 11c which establish the image transmission characteristics when the lens group $L_4$ through $L_8$ is shifted forward as a unit by about 22 mm while at the same time, the movable lens elements in the relay lens group $L_{11}$ through $L_{14}$ is shifted rearward by about 3.7 mm. As can be seen, the negative displacement of the off-axial image surface has been returned to the normal acceptable photographic standards.

A fourth embodiment of the present invention is provided with a different set of zooming focal lengths in the following Table 2.

Table 2

| | | | | f = 7.5~45 | Aperture Ratio 1:1.7 | | Field Angle 2ω = 50°~9° | | | |
|---|---|---|---|---|---|---|---|---|---|---|
| | | | | Radius of Curvature | | Axial Distance | | Refractive Index | | Abbe Number |
| F | $L_1$ | | $r_1$ | 131.24 | $d_1$ | 1.1 | $N_1$ | 1.7618 | $\nu_1$ | 26.6 |
| | $L_2$ | | $r_2$ | 35.17 | $d_2$ | 7.3 | $N_2$ | 1.6775 | $\nu_2$ | 55.4 |
| | | | $r_3$ | −171.29 | $d_3$ | 0.1 | | | | |
| | $L_3$ | | $r_4$ | 28.07 | $d_4$ | 4.3 | $N_3$ | 1.6583 | $\nu_3$ | 58.5 |
| | | | $r_5$ | 81.65 | $d_5$ | 0.47~21.42 (variable) | | | | |
| V | $L_4$ | | $r_6$ | 38.42 | $d_6$ | 0.8 | $N_4$ | 1.6935 | $\nu_4$ | 51.8 |
| | | | $r_7$ | 11.43 | $d_7$ | 4.23 | | | | |
| | $L_5$ | | $r_8$ | −26.48 | $d_8$ | 0.8 | $N_5$ | 1.6583 | $\nu_5$ | 58.5 |
| | $L_6$ | | $r_9$ | 13.10 | $d_9$ | 2.7 | $N_6$ | 1.8052 | $\nu_6$ | 25.4 |
| | | | $r_{10}$ | 59.12 | $d_{10}$ | 20.9~1.88 (variable) | | | | |
| C | $L_7$ | | $r_{11}$ | −9.51 | $d_{11}$ | 0.8 | $N_7$ | 1.6935 | $\nu_7$ | 53.4 |
| | | | $r_{12}$ | −92.19 | $d_{12}$ | 2.88~0.95 (variable) | | | | |
| | $L_8$ | | $r_{13}$ | −50.96 | $d_{13}$ | 1.6 | $N_8$ | 1.6775 | $\nu_8$ | 55.4 |
| | | | $r_{14}$ | −15.46 | $d_{14}$ | 0.1 | | | | |
| | | | $r_{15}$ | 35.6 | | | | | | |

Table 2-continued

| | | | $f = 7.5\sim45$ | Aperture Ratio 1:1.7 | Field Angle $2\omega = 50°\sim9°$ | | | |
|---|---|---|---|---|---|---|---|---|
| | | | Radius of Curvature | | Axial Distance | Refractive Index | | Abbe Number |
| R | $L_9$ | $r_{16}$ | $-55.42$ | $d_{15}$ | 1.45 | $N_9$ | 1.6775 | $\nu_9$ | 55.4 |
| | | | | $d_{16}$ | 13.2 | | | |
| | $L_{10}$ | $r_{17}$ | 17.05 | $d_{17}$ | 2.02 | $N_{10}$ | 1.6968 | $\nu_{10}$ | 55.2 |
| | | $r_{18}$ | $-843.0$ | | | | | |
| | | | | $d_{18}$ | 2.22 | | | |
| | $L_{11}$ | $r_{19}$ | $-24.75$ | $d_{19}$ | 0.94 | $N_{11}$ | 1.7618 | $\nu_{11}$ | 26.6 |
| | | $r_{20}$ | 18.32 | | | | | |
| | | | | $d_{20}$ | 1.54 | | | |
| | $L_{12}$ | $r_{21}$ | 77.57 | $d_{21}$ | 2.66 | $N_{12}$ | 1.6214 | $\nu_{12}$ | 61.3 |
| | | $r_{22}$ | $-20.07$ | | | | | |
| | | | | $d_{22}$ | 0.22 | | | |
| | $L_{13}$ | $r_{23}$ | 17.83 | $d_{23}$ | 2.4 | $N_{13}$ | 1.6214 | $\nu_{13}$ | 61.3 |
| | | $r_{24}$ | $-123.72$ | | | | | |

F ($L_1\sim L_3$) : Focusing Lens Group
V ($L_4\sim L_6$) : Variator Lens Group
C ($L_7$) : Compensator Lens Group
R ($L_8\sim L_{13}$) : Relay Lens Group FIG. 12 discloses a schematic representation of the lens elements of Table 2 at an extreme wide angle photographic mode of operation focused at infinity. For the purpose of focusing this lens system within the normal range of object distances, the focusing lens group $L_1$ to $L_3$ can be shifted. For macrophotography, the compensator lens group $L_7$ is shifted forward from the position indicated in FIG. 12 to the position in FIG. 13 while at the same time the lens components $L_8$ and $L_9$ of the relay lens group is shifted forward at the same rate as that of the compensator lens group $L_7$. The remaining movable lens elements in the relay lens group, lens components $L_{10}$, $L_{11}$, $L_{12}$ and $L_{13}$ are also shifted forward but at a rate equivalent to 3/2 times the rate of the compensator lens group. The specific direction of movement of the individual lens elements can be seen by reference to FIG. 13. The compensator lens group $L_7$ and the relay lens components $L_8$ and $L_9$ will be shifted forward by approximately 1 mm while the relay lens components $L_{10}$, $L_{11}$, $L_{12}$ and $L_{13}$ will be shifted by approximately 1.5 mm.

Referring to the aberration plots of FIGS. 14a, 14b and 14c, the image transmission characteristics that occur when only the compensator lens group $L_7$ is shifted forward by 1 mm from its position at its extreme wide angle photographic mode of operation is shown.

FIGS. 15a, 15b and 15c are the resulting aberration curves produced when the lens system in accordance with the present invention is shifted to compensate for aberrations in a macrophtography mode of operation. As can be seen by comparison of the two sets of curves, the present invention provides a particularly satisfactory compensation of chromatic aberration plus compensation of spherical aberration and astigmatism, thus, permitting a well-balanced aberration compensation to be applied to the final transmitted image.

Figure 16:
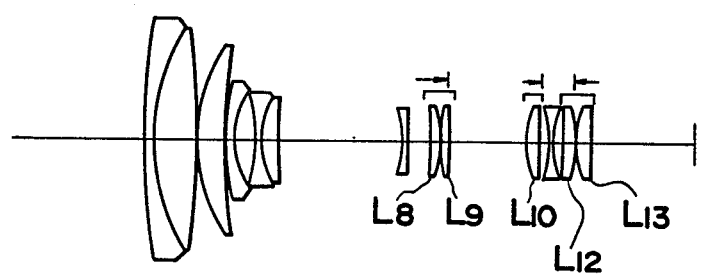
FIG. 16 is a cross-sectional schematic view of another embodiment of the present invention in a macrophotographic position.

A fifth example of the present invention is disclosed in the schematic of FIG. 16 again using the lens elements set forth in Table 2. In this embodiment the lens group $L_1$ to $L_3$ is again shifted forward for focusing within the normal range of object distance. In a macrophotography mode of operation the lens components $L_8$ and $L_9$ of the relay lens group are shifted rearward from the position indicated in FIG. 12 while component $L_{10}$ of the relay lens group is shifted rearward at the same rate. The remaining movable lens components of the rear lens group, $L_{12}$ and $L_{13}$, however, are shifted forward as a unit at 4/5 the above said rate at the same time. In FIG. 16, the macrophotography mode of operation is shown wherein the components $L_8$, $L_9$ and $L_{10}$ of the relay lens group have been shifted rearward by 1 mm each and the lens components $L_{12}$ and $L_{13}$ have been shifted forward by 0.8 mm.

Figure 17A:
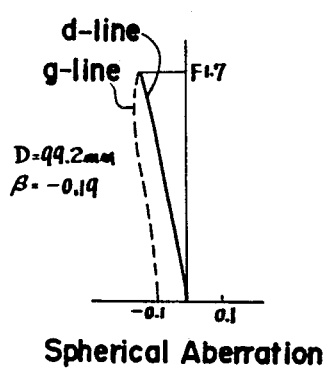
FIGS. 17a, 17b and 17c are respective aberration curves for the embodiment of FIG. 16 when lens components L8 and L9 are only moved towards the image side.
Figure 17B:
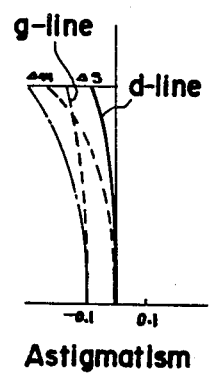
Figure 17C:
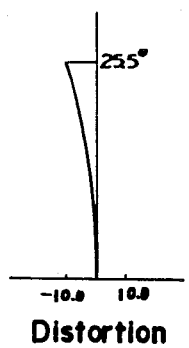
Figure 18A:
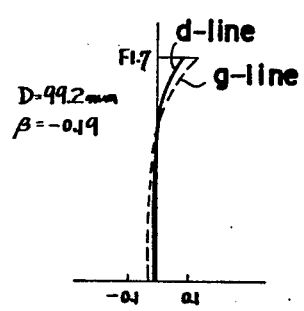
FIGS. 18a, 18b and 18c are the respective aberration curves for a macrophotographic position of the embodiment of FIG. 16 in accordance with the principles of the present invention.
Figure 18B:
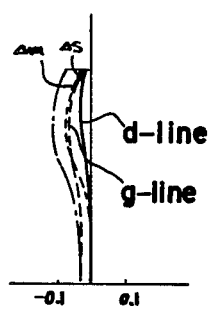
Figure 18C:
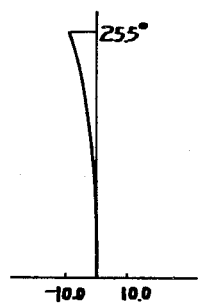

Again, a comparison of the resulting aberration curves will disclose the advantages of the present invention. Thus, in FIG. 17a, 17b and 17c the image transmission characteristics are shown when only the lens components $L_8$ and $L_9$ of the relay lens group alone have been shifted rearward by 1 mm for macrophotography in an attempt to achieve the same magnification resulting from the present invention. In the aberration plots of FIG. 18a, 18b and 18c, the respective lens elements are positioned in accordance with the above described parameters of the macrophotography mode of operation. By comparing the figures it can be seen that satisfactory aberration compensation is provided by the present invention.

Figure 19:
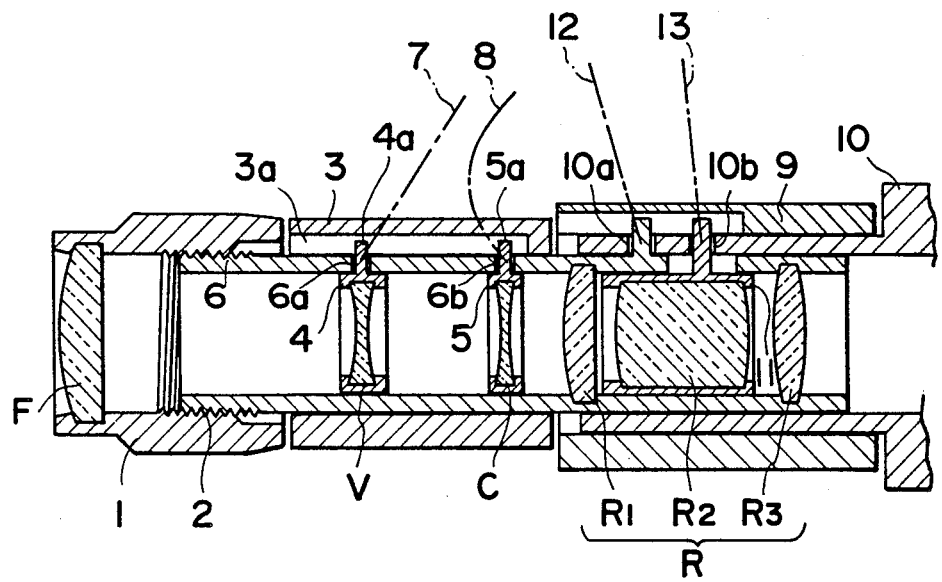
FIG. 19 is a schematic cross-sectional view of a lens barrel mechanism suitable for the embodiment of FIG. 2.

FIG. 19 is a schematic cross-sectional view of a lens barrel mechanism suitable for use with the first example disclosed in FIG. 2. The relative lens movement can be seen by the imaginary lines plotted above the figure. As can be appreciated by an optical lens designer, the construction and cost of this lens barrel mechanism is relatively inexpensive considering both the scope of its optical performance and its image transmission characteristics. Focusing in the zooming mode of operation can be effectuated by rotating the focusing barrel 1 along the helicoid 2. The zooming operation is effectuated by rotating barrel 3 which in turn rotates lens barrels 4 and 5 through the engagement of pins 4a and 5a with a groove 3a that is parallel aligned with the optical axis. Respective cam surfaces 6a and 6b define the translation of the rotating lens barrels 4 and 5 along the direction of the optical axis to thereby shift the variator lens group, V, and compensator lens group, C, in a predetermined manner. This relative movement in the zooming mode of operation can be seen by comparing the imaginary lines 7 and 8 respectively.

Macrophotography can be effectuated in a second mode of operation by the rotation of lens barrel 9. When lens barrel 9 is rotated, lens barrel 6 is shifted in accordance with its interfacing with cam 10a of lens barrel 10. This lens barrel movement shifts the entire lens system, that is, lens groups F, V, C and the lens elements R1 and R3 of the relay lens group R. Additionally, lens barrel 11 is shifted in accordance with the constraints of cam 10b and moves a portion of the relay lens group, lens component R2 relative to the rest of the lens system. The resulting movement produced by lens barrel 6 and lens barrel 11 can be seen by comparing the imaginary lines 12 and 13.

Figure 20:
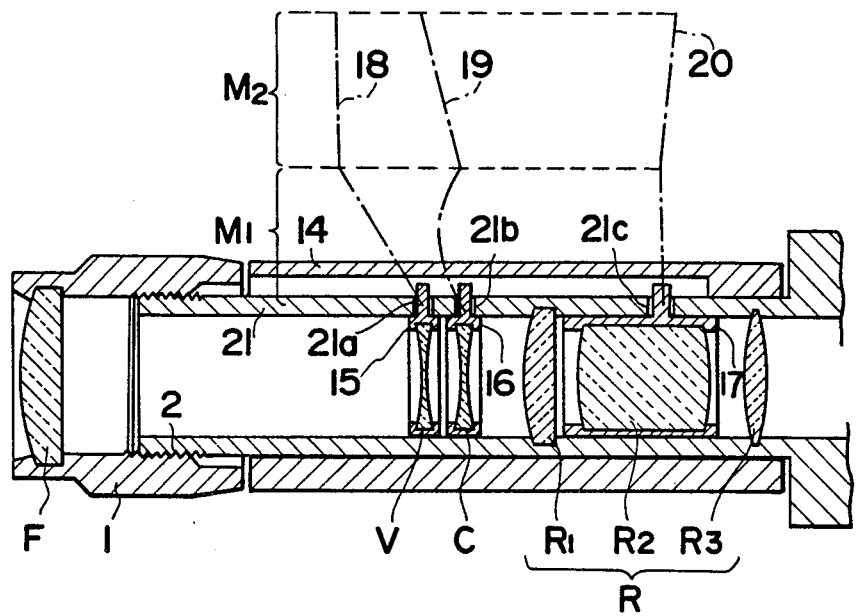
FIG. 20 is a schematic cross-sectional view of a lens barrel mechanism suitable for the lens system of FIG. 5.

FIG. 20 is a cross-sectional schematic view of another lens barrel mechanism that is particularly suitable for the second example shown in FIG. 5. Again, the focusing operation in the first zooming mode can be effectuated by rotation of the first lens barrel 1.

When the lens barrel 14 is rotated, the respective lens barrels 15, 16 and 17 are shifted or moved in accordance with the imaginary lines 18, 19 and 20 as a result of their engagement with the cam surfaces 21a, 21b and 21c respectively. As can be seen, lens barrel 14 can be rotated to effectuate both the macro and zooming modes of operation. This is illustrated in the imaginary lines wherein M1 represents the zooming lens movement while M2 represents the macro lens movement. This particular lens element movement is effectuated by positioning the cam 21c so that it lies in a plane perpendicular to the optical axis in the first angular or rotational movement of the lens barrel 14 as shown within M1. Accordingly, cam 21c does not provide any movement to the lens barrel 17 in the zooming mode of operation.

As can be appreciated by an optical designer, the lens barrel mechanism that would be suitable for the examples 3 and 4 shown in respectively FIGS. 9 and 13 are similar to that shown in FIG. 20. Obvious modifications for carrying the movable lens elements and the shape of the cams for guiding the resulting movement could be easily effectuated.

Figure 21:
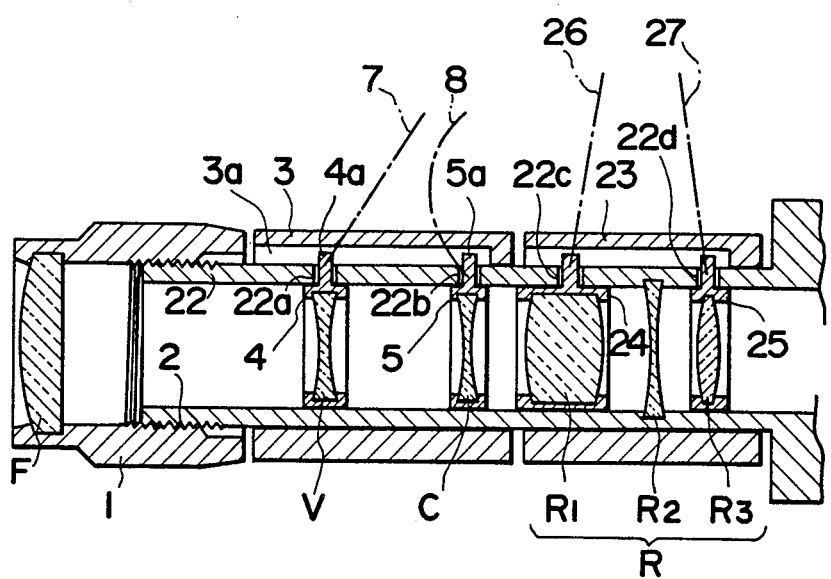
FIG. 21 is a schematic cross-sectional view of a lens barrel mechanism suitable for the lens system of FIG. 13.

FIG. 21 shows still another cross-sectional schematic view of a suitable lens barrel mechanism for the present invention. In particular, example 5 disclosed in FIG. 13 would be suitable for the lens barrel mechanism of FIG. 21. Both the focusing and the zooming mode of operation are effectuated in the same manner as disclosed with respect to FIG. 19, with lens barrel 22 fixed. Again, the imaginary line 7 and 8 disclose the relative displacement of the variator and compensator lens groups in the first zooming mode of operation.

The second mode of operation for macrophotography is effectuated by rotating the lens barrel 23 which in turn, moves the lens barrels 24 and 25. The specific translation of these lens barrels 24 and 25 are governed by their respective cams 22c and 22d and the resultant movement is shown by the imaginary lines 26 and 27.

While the above embodiments have been disclosed as the best mode presently contemplated by the inventors, it should be realized that these examples should not be interpreted as limiting, because artisans skilled in this field, once given the present teachings, can vary from these specific embodiments. Accordingly, the scope of the present invention should be determined solely from the following claims in which

What is claimed is:

1. A zoom lens system capable of macrophotography comprising:
   a focusing lens group;
   a variator lens group;
   a compensator lens group; and
   a relay lens group, said focusing lens group being shiftable in a first mode of operation for focusing an object within a normal photographic range from infinity to a relatively close object distance, said variator and compensator lens groups being shiftable according to a predetermined relationship to provide a zooming operation in said first mode, at least a part of said zoom lens system being shiftable in a different manner from that in said first mode for focusing an object within a macrophotography range in a second mode of operation, and at least a part of said relay lens group, having a substantial refractive power, being shiftable with relation to the shift of said part of said zoom lens system in said second mode for correcting any undesirable introduction of aberrations in said second mode.

2. The invention of claim 1, wherein said entire zoom lens system is shiftable as a unit in said second mode for focusing an object within a macrophotography range and at least a part of said relay lens group is shiftable relative to said whole lens system for correcting aberrations in said second mode.

3. The invention on claim 1, wherein at least a part of said zoom lens system other than said focusing lens group is shiftable in said second mode for focusing an object within a macrophotography range and at least a part of said relay lens group is shiftable for correcting any aberrations in said second mode.

4. The invention of claim 3, wherein at least a part of said variator and compensator lens groups are shiftable in a different manner from their movement in the zooming operation for focusing an object within a macrophotography range in said second mode and at least a part of said relay lens group is shiftable for correcting any aberrations in said second mode.

5. The invention of claim 4, wherein said compensator lens group is only shiftable toward the object side with said variator lens group left stationary in said second mode.

6. The invention of claim 4, wherein both said variator and compensator lens groups are shiftable in a different manner from their movement in the zooming operation, in said second mode.

7. The invention of claim 6, wherein said variator and compensator lens groups are shiftable as one integrated unit toward the object side in said second mode.

8. The invention of claim 1, wherein a first part of said relay lens group is shiftable in said second mode for focusing an object within a macrophotography range and a second part of said relay lens group is shiftable for correcting aberrations in said second mode.

9. An improved zoom lens system with macrophotography capabilities comprising:
   means for focusing the lens system;
   a variator lens group;
   a compensator lens group, and
   a relay lens group including a plurality of movable lens elements, the variator and compensator lens groups being relatively displaced for a first zooming mode of operation and at least one lens element of those movable lens elements in the relay lens group having a substantial refraction power and being movable along an optical axis to provide correction of abberations in a second macrophotography mode of operation.

10. The invention of claim 9 wherein the entire relay lens group consists of only movable lens elements.

11. The invention of claim 10 wherein all of the relay lens group elements are movable for macrophotography.

12. The invention of claim 11 wherein the compensator lens group and the relay lens group are movable toward the object side of the zoom lens system during repositioning for macrophotography.

13. The invention of claim 9 wherein the relay lens group further comprises first and second movable subgroups and a third stationary subgroup.

14. The invention of claim 13 wherein the first and second movable subgroups are positioned on the object side of the stationary subgroup and are relatively displaceable from the stationary subgroup during repositioning for macrophotography.

15. The invention of claim 13 wherein the first and second movable subgroups are positioned on either side of the stationary subgroup and are both relatively displaceable from the stationary subgroup during repositioning for macrophotography.

16. An improved zoom lens system with macrophotography capabilities comprising a design parameter of approximate values within the following specification:

| | | | | f = 75~200 | Aperture Ratio 1:4.0 | Field Angle 2ω = 32°~12° | | | | |
|---|---|---|---|---|---|---|---|---|---|---|
| | | | | Radius of Curvature | | Axial Distance | | Refractive Index | | Abbe Number |
| F | $L_1$ | | $r_1$ | 95.7 | $d_1$ | 5.6 | $n_1$ | 1.5176 | $\nu_1$ | 53.5 |
| | | | $r_2$ | 735.6 | $d_2$ | 0.1 | | | | |
| | $L_2$ | | $r_3$ | 102.8 | $d_3$ | 1.7 | $n_2$ | 1.7545 | $\nu_2$ | 32.8 |
| | | | $r_4$ | 46.0 | $d_4$ | 7.1 | $n_3$ | 1.6031 | $\nu_3$ | 60.7 |
| | $L_3$ | | $r_5$ | 1546.0 | $d_5$ | 4.8~43.0 (variable) | | | | |
| V | $L_4$ | | $r_6$ | 124.3 | $d_6$ | 1.2 | $n_4$ | 1.72 | $\nu_4$ | 50.2 |
| | | | $r_7$ | 41.0 | $d_7$ | 5.7 | | | | |
| | $L_5$ | | $r_8$ | −44.9 | $d_8$ | 1.5 | $n_5$ | 1.6 | $\nu_5$ | 64.4 |
| | | | $r_9$ | 44.3 | $d_9$ | 3.2 | $n_6$ | 1.7847 | $\nu_6$ | 25.8 |
| | $L_6$ | | $r_{10}$ | 285.3 | $d_{10}$ | 39.1~3.3 (variable) | | | | |
| C | $L_7$ | | $r_{11}$ | −128.0 | $d_{11}$ | 1.9 | $n_7$ | 1.6057 | $\nu_7$ | 37.8 |
| | | | $r_{12}$ | 88.5 | $d_{12}$ | 1.8 | $n_8$ | 1.744 | $\nu_8$ | 45.0 |
| | $L_8$ | | $r_{13}$ | 245.4 | $d_{13}$ | 3.9~1.5 (variable) | | | | |
| R | $L_9$ | | $r_{14}$ | ∞ | $d_{14}$ | 2.8 | $n_9$ | 1.4875 | $\nu_9$ | 70.2 |
| | | | $r_{15}$ | −66.9 | $d_{15}$ | 0.1 | | | | |
| | $L_{10}$ | | $r_{16}$ | 113.7 | $d_{16}$ | 2.6 | $n_{10}$ | 1.4875 | $\nu_{10}$ | 70.2 |
| | | | $r_{17}$ | −238.7 | $d_{17}$ | 0.1 | | | | |
| | $L_{11}$ | | $r_{18}$ | 34.5 | $d_{18}$ | 7.0 | $n_{11}$ | 1.4875 | $\nu_{11}$ | 70.2 |
| | $L_{12}$ | | $r_{19}$ | −65.6 | $d_{19}$ | 2.7 | $n_{12}$ | 1.7569 | $\nu_{12}$ | 31.8 |
| | | | $r_{20}$ | −1115.0 | $d_{20}$ | 42.3 | | | | |
| | $L_{13}$ | | $r_{21}$ | 163.2 | $d_{21}$ | 5.2 | $n_{13}$ | 1.5168 | $\nu_{13}$ | 64.0 |
| | | | $r_{22}$ | −171.4 | $d_{22}$ | 3.9 | | | | |
| | $L_{14}$ | | $r_{23}$ | −22.5 | $d_{23}$ | 1.5 | $n_{14}$ | 1.7352 | $\nu_{14}$ | 40.9 |
| | | | $r_{24}$ | 531.5 | $d_{24}$ | 3.9 | | | | |
| | $L_{15}$ | | $r_{25}$ | 118.0 | $d_{25}$ | 6.0 | $n_{15}$ | 1.62 | $\nu_{15}$ | 36.3 |
| | | | $r_{26}$ | −42.1 | | | | | | | wherein F is Focusing Lens Group, V is Variator Lens Group, C is Compensator Lens Group, R is Relay Lens Group and L is Lens element with the subscript numbers determining relative position from object to image side of the lens system.

17. An improved zoom lens system with macrophotography capabilities comprising a design parameter of approximate values within the following specification:

| | | | f = 0 7.5~45 Aperture Ratio 1:1.7 Field Angle 2ω = 50°~9° | | | | | | |
|---|---|---|---|---|---|---|---|---|---|
| | | | Radius of Curvature | | Axial Distance | | Refractive Index | | Abbe Number |
| F | $L_1$ | $r_1$ | 131.24 | $d_1$ | 1.1 | $N_1$ | 1.7618 | $\nu_1$ | 26.6 |
| | | $r_2$ | 35.17 | $d_2$ | 7.3 | $N_2$ | 1.6775 | $\nu_2$ | 55.4 |
| | $L_2$ | $r_3$ | −171.29 | $d_3$ | 0.1 | | | | |
| | $L_3$ | $r_4$ | 28.07 | $d_4$ | 4.3 | $N_3$ | 1.6583 | $\nu_3$ | 58.5 |
| | | $r_5$ | 81.65 | $d_5$ | 0.47~1.42 (variable) | | | | |
| V | $L_4$ | $r_6$ | 38.42 | $d_6$ | 0.8 | $N_4$ | 1.6935 | $\nu_4$ | 51.8 |
| | | $r_7$ | 11.43 | $d_7$ | 4.23 | | | | |
| | $L_5$ | $r_8$ | −26.48 | $d_8$ | 0.8 | $N_5$ | 1.6583 | $\nu_5$ | 58.5 |
| | | $r_9$ | 13.10 | $d_9$ | 2.7 | $N_6$ | 1.8052 | $\nu_6$ | 25.4 |
| | $L_6$ | $r_{10}$ | 59.12 | $d_{10}$ | 20.9~1.88 (variable) | | | | |
| C | $L_7$ | $r_{11}$ | −9.51 | $d_{11}$ | 0.8 | $N_7$ | 1.6935 | $\nu_7$ | 53.4 |
| | | $r_{12}$ | −92.19 | $d_{12}$ | 2.88~0.95 (variable) | | | | |
| R | $L_8$ | $r_{13}$ | −50.96 | $d_{13}$ | 1.6 | $N_8$ | 1.6775 | $\nu_8$ | 55.4 |
| | | $r_{14}$ | −15.46 | $d_{14}$ | 0.1 | | | | |
| | $L_9$ | $r_{15}$ | 35.6 | $d_{15}$ | 1.45 | $N_9$ | 1.6775 | $\nu_9$ | 55.4 |
| | | $r_{16}$ | −55.42 | $d_{16}$ | 13.2 | | | | |
| | $L_{10}$ | $r_{17}$ | 17.05 | $d_{17}$ | 2.02 | $N_{10}$ | 1.6968 | $\nu_{10}$ | 55.2 |
| | | $r_{18}$ | −843.0 | $d_{18}$ | 2.22 | | | | |
| | $L_{11}$ | $r_{19}$ | −24.75 | $d_{19}$ | 0.94 | $N_{11}$ | 1.7618 | $\nu_{11}$ | 26.6 |
| | | $r_{20}$ | 18.32 | $d_{20}$ | 1.54 | | | | |
| | $L_{12}$ | $r_{21}$ | 77.57 | $d_{21}$ | 2.66 | $N_{12}$ | 1.6214 | $\nu_{12}$ | 61.3 |
| | | $r_{22}$ | −20.07 | $d_{22}$ | 0.22 | | | | |
| | $L_{13}$ | $r_{23}$ | 17.83 | $d_{23}$ | 2.4 | $N_{13}$ | 1.6214 | $\nu_{13}$ | 61.3 |
| | | $r_{24}$ | −123.72 | | | | | | | wherein F is Focusing Lens Group, V is Variator Lens Group, C is Compensator Lens Group, R is Relay Lens Group and L is Lens Element with the subscript numbers determining relative position from object to image side of the lens system.

18. A zoom lens system capable of macrophotography comprising:
a focusing lens group;
a variator lens group;
a compensator lens group; and
a relay lens group, said focusing lens group being shiftable in a first mode of operation for focusing an object within a normal photographic range from infinity to a relatively close object distance, said variator and compensator lens groups being shiftable according to a predetermined relationship to provide a zooming operation in said first mode, at least a part of said zoom lens system being shiftable in a different manner from that in said first mode for focusing an object within a macrophotography range in a second mode of operation, and at least a part of said relay lens group being shiftable with relation to the shift of said part of said zoom lens system in said second mode for correcting any undesirable introduction of aberrations in said second mode, wherein a first part of said relay lens group is shiftable in said second mode for focusing an object within a macrophotography range and a second part of said relay lens group is shiftable for correcting aberrations in said second mode and at least a part of said compensator lens group is further shiftable in coordinated movement with said first part of said relay lens group in said second mode.

19. A zoom lens system capable of macrophotography comprising:
a focusing lens group;
a variator lens group;
a compensator lens group; and
a relay lens group, said focusing lens group being shiftable in a first mode of operation for focusing an object within a normal photographic range from infinity to a relatively close object distance, said variator and compensator lens groups being shiftable according to a predetermined relationship to provide a zooming operation in said first mode, at least a part of said zoom lens system being shiftable in a different manner from that in said first mode for focusing an object within a macrophotography range in a second mode of operation, and at least a part of said relay lens group being shiftable with relation to the shift of said part of said zoom lens system in said second mode for correcting any undesirable introduction of aberrations in said second mode wherein said entire zoom lens system is shiftable as a unit in said second mode for focusing an object within a macrophotography range and at least a part of said relay lens group is shiftable relative to said whole lens system for correcting aberrations in said second mode.

20. A zoom lens system capable of macrophotography comprising:
   a focusing lens group;
   a variator lens group;
   a compensator lens group, and
   a relay lens group, said focusing lens group being shiftable in a first mode of operation for focusing an object within a normal photographic range from infinity to a relatively close object distance, said variator and compensator lens groups being shiftable according to a predetermined relationship to provide a zooming operation in said first mode, at least a part of said zoom lens system being shiftable in a different manner from that in said first mode for focusing an object within a macrophotography range in a second mode of operation, and at least a part of said relay lens group being shiftable with relation to the shift of said part of said zoom lens system in said second mode for correcting any undesirable introduction of aberrations in said second mode wherein a first part of said relay lens group is shiftable in said second mode for focusing an object within a macrophotography range and a second part of said relay lens group is shiftable for correcting aberrations in said second mode.

21. An improved zoom lens system with macrophotography capabilities comprising:
   means for focusing the lens system;
   a variator lens group;
   a compensator lens group, and
   a relay lens group including a plurality of movable lens elements, the variator and compensator lens groups being relatively displaced for a first zooming mode of operation and at least one image side lens element of those movable lens elements in the relay lens group being movable along an optical axis to provide correction of aberrations in a second macrophotography mode of operation wherein the entire relay lens group consists of only movable lens elements.

* * * * *

UNITED STATES PATENT AND TRADEMARK OFFICE
CERTIFICATE OF CORRECTION

PATENT NO. : 4,198,126
DATED : April 15, 1980
INVENTOR(S) : Haruo Abe, Mitsuo Yasukuni It is certified that error appears in the above—identified patent and that said Letters Patent is hereby corrected as shown below:

Column 2, lines 32-33, delete "particularly" and insert --particularity--.

Column 5, Table 1, line 3, delete "$d_2$" below "735.6" and above "102.8" in column; insert --$d_2$-- in column below "$d_1$" and above "$d_3$"; delete "0.1" below "$d_1$" and above "$d_3$"; insert --0.1-- in column below "5.6" and above "1.7".

Column 5, line 4, delete "46.0" from Radius of Curvature Column and insert --$r_4$--; insert --46.0-- in next column below "102.8" and above "1546.0".

Column 12, line 26, delete "on" and insert --of--.

Column 16, Claim 17, eighth column, delete "1" above "$\nu_{12}$"

Signed and Sealed this

Twenty-sixth Day of May 1981

[SEAL]

*Attest:*

RENE D. TEGTMEYER

*Attesting Officer*     *Acting Commissioner of Patents and Trademarks*